UNITED STATES PATENT OFFICE.

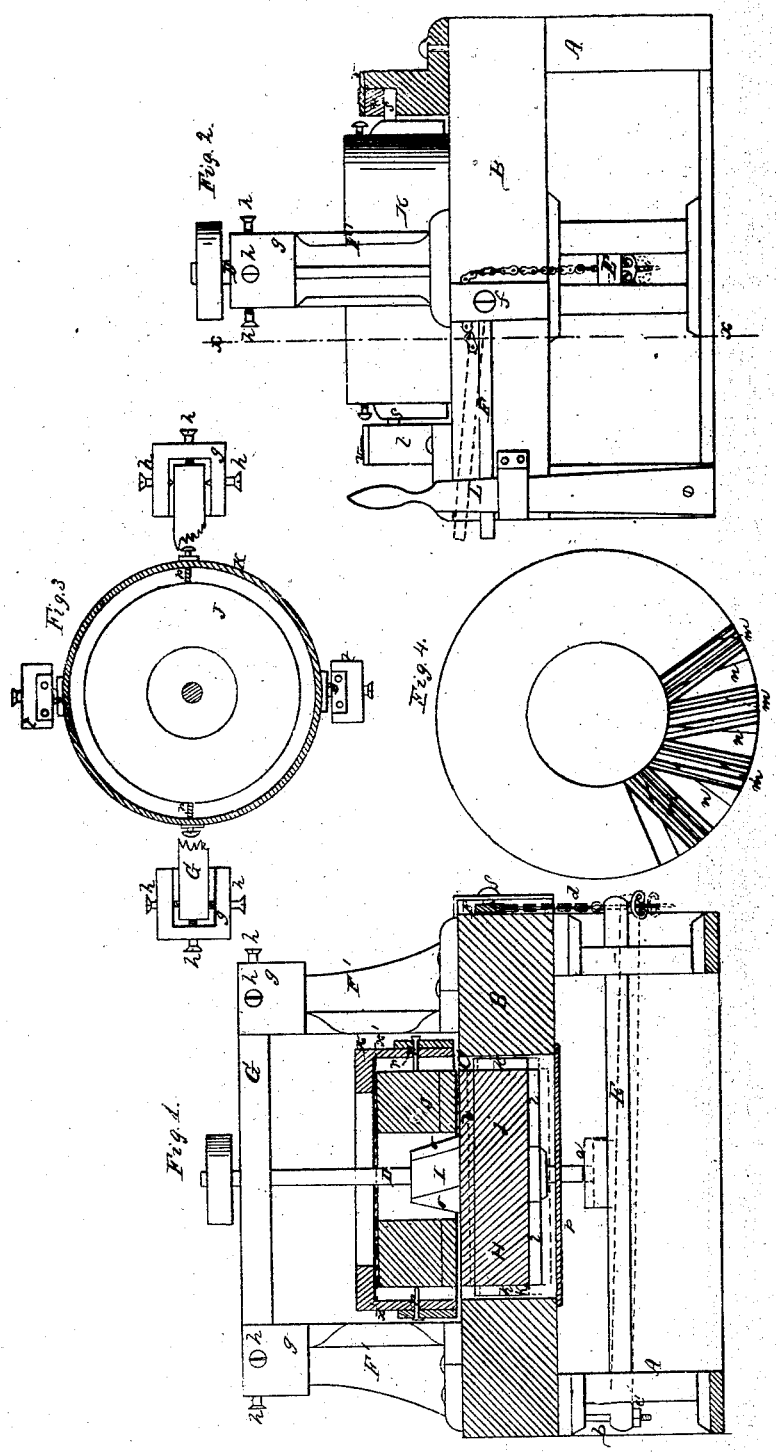

JEREMIAH TILTON, OF NORTHFIELD, AND EDWIN RITSON, OF SANBORNTON, NEW HAMPSHIRE.

MACHINERY FOR CUTTING FLOCK.

Specification of Letters Patent No. 28,316, dated May 15, 1860.

*To all whom it may concern:*

Be it known that we, JEREMIAH TILTON, of Northfield, in the county of Merrimack, and EDWIN RITSON, of Sanbornton, in the county of Belknap and State of New Hampshire, have invented a new and Improved Machine for Cutting Flock; and we do hereby declare that the following is a full, clear, and exact description of the same, reference being had to the annexed drawings, making a part of this specification, in which—

Figure 1, is a vertical section of our invention taken in the line $x$, $x$, Fig. 2. Fig. 2, a side elevation of the same. Fig. 3, a horizontal section of the same taken in the line $x'$, $x'$, Fig. 1. Fig. 4, a detached face view of one of the cutters.

Similar letters of reference indicate corresponding parts in the several figures.

The object of this invention is to obtain a machine that will operate rapidly in cutting flock, perform the work perfectly and at the same time be capable of being so adjusted as to admit of the ready discharge of foreign substances without injuring the cutting device. The stock from which flock is prepared, being most generally the refuse from cloth and woolen manufactories, is liable to contain foreign substances such as nails, bits of metal and the like, which are a great detriment to the cutters of a flock cutting machine and hitherto the keeping of the cutters of such machines has been attended with considerable expense, which is obviated by our invention.

To enable those skilled in the art to fully understand and construct our invention, we will proceed to describe it.

A represents a rectangular frame which supports a horizontal bed B, in which a circular opening C, is made.

D is a vertical shaft the lower end of which is stepped in a bridge tree E, as shown at $a$, one end of said bridge tree being fitted to the lower end of a rod $b$, by a nut $c$, and the opposite end having a chain $d$, connected to it, said chain having its upper end attached to a lever F, which is secured to one side of the bed B, by a fulcrum pin $f$, as shown clearly in Fig. 2. The upper end of the shaft D, has its bearing in a crop bar G, the ends of which are fitted in sockets $g$, $g$, at the upper ends of uprights F′, F′. These sockets $g$, have set screws $h$, passing horizontally through their sides to admit of the adjustment of bar G, with a view to the keeping of the shaft D, in a vertical position. This will be fully understood by referring to Fig. 3.

On the shaft D, there is placed a cutter H, which is formed of a metal plate $i$, attached to a cylindrical block $j$ of wood. The cutter H, is somewhat less in diameter than the opening C, and to the external surface of the block $j$, two or more wings or cleavers $k$, $k$, are attached. These wings or cleavers project out from the sides of the block a suitable distance and they may be vertical or slightly inclined. The bottom of the block $j$, has two horizontal wings or cleavers $l$, $l$, attached radially to it, and projecting down a suitable distance from the block as shown clearly in Fig. 1. The plate $i$, has its face side provided with a series of cutting projections $m$, which have a somewhat tangential position, and are placed in sets of three, parallel with each other, with an inclined grooved space $n$, between the sets, as shown clearly in Fig. 4. At the center of the plate $i$, there is a feeder I, which is simply a frustum of a cone with inclined ledges or projections $o$ at its side (see Fig. 1).

The opening C, is provided with a bottom plate $p$, which has an opening at its center to allow the shaft D, to pass through.

J represents a cutter which is constructed precisely similar to the cutter H, and is inverted occupying a position directly over it. The cutter J, is secured by set screws $r$, in a curb K, so as to be concentric with the cutter H, and the cutter J, is allowed to work or swing on or between said screws $r$. The curb K, is suspended by journals $s$, $s$, in bearings $t$, $t$, which are attached to the upper surface of the bed B, and at points in a plane at right angles to the set screws $r$, $r$, as shown clearly in Fig. 3. The curb K, is allowed to swing freely on its journals $s$, $s$, and the cutter J, is allowed to swing freely between the screws $r$, $r$. Directly over each journal $s$, in the bearings $t$, a piece of india-rubber $u$, is placed as shown in Fig. 2, said rubber being secured in the bearings by plates $v$ (see Fig. 2) in which one of the bearings is shown bisected vertically. The lever F, is retained at a point to keep the cutters H, J, in a proper working position relatively with each other by means of a catch L, shown in Fig. 2.

The operation is as follows: The shaft D, is rotated by any convenient power and the stock is dropped into the eye of the cutter J, the stock being fed by the feeder I, between the faces of the cutters H, J, the stock being cut by the action of the projections $m$, and passed out through the grooves $n$. The stock is cut to the proper degree of fineness by adjusting the lower rotating cutter H, sufficiently close to the cutter J, and this is done by the bridge tree E, and lever F, the catch L, as previously stated, retaining the bridge tree and cutter in proper position. The flock is discharged from between the cutters H, J, into the space C, and is discharged through a suitable spout from said space by means of the cleavers $k, k, l, l$.

In consequence of having the upper stationary cutter J, hung within its curb K, by screws $r$, and having the curb K, hung or suspended on journals $s, s$, the cutter is allowed to swing similarly to a compass-box, and conform to the position of the rotary cutter H. The parallelism of the faces of the two cutters will therefore be preserved and the perfect operation of the same insured.

In case a hard foreign substance should pass between the cutters H, J, the attendant by actuating catch L, releases lever F, and the cutter H, instantly drops by its gravity and the substance passes out from between the cutters, the operator then depresses lever F, and thereby raises the cutter H, to its original working position. The india-rubber pieces $a$, in the bearings $t$, admit of a certain degree of vertical play to the cutter J, to compensate for slight irregularities of feed.

Having thus described our invention what we claim and desire to secure by Letters Patent is:

The employment or use in a flock-cutting machine, of two cutters H, J, arranged substantially as shown, so that one cutter H, will have a rotary motion and a vertical adjusting movement, and the other cutter J, an universal self-adjusting movement for the purposes herein set forth.

JEREMIAH TILTON.
EDWIN RITSON.

Witnesses:
  JAMES P. TILTON,
  B. M. COLBY.